United States Patent [19]

Pippert

[11] 4,310,163
[45] Jan. 12, 1982

[54] ANTI-EXTRUSION SEALS AND PACKINGS

[75] Inventor: Aaron J. Pippert, Houston, Tex.

[73] Assignee: Utex Industries, Inc., Houston, Tex.

[21] Appl. No.: 110,937

[22] Filed: Jan. 10, 1980

[51] Int. Cl.³ .............................................. F16J 15/18
[52] U.S. Cl. ................................ 277/188 A; 277/125;
  277/205; 277/230; 277/235 R
[58] Field of Search ................................ 277/123–125,
  277/180, 188 R, 188 A, 205, 206 R, 227–230,
  233, 234, 235 R, 166, 179

[56] References Cited

U.S. PATENT DOCUMENTS

| 2,081,040 | 5/1937 | King | 277/205 X |
| 2,844,421 | 7/1958 | Hayman | 277/188 A |
| 2,926,976 | 3/1960 | Bowerman et al. | 277/188 R X |
| 2,964,366 | 12/1960 | Reynolds | 277/188 A |
| 3,009,721 | 11/1961 | Newton | 277/188 R |
| 3,094,337 | 6/1963 | Pippert et al. | 277/188 A |
| 3,279,805 | 10/1966 | Quinson | 277/180 X |
| 3,540,745 | 11/1970 | Flock | 277/205 X |
| 3,719,366 | 3/1973 | Pippert | 277/230 X |
| 4,138,144 | 2/1979 | Pierce | 277/235 R X |
| 4,219,204 | 8/1980 | Pippert | 277/188 A |

FOREIGN PATENT DOCUMENTS

| 529112 | 8/1956 | Canada | 277/205 |
| 1553550 | 12/1968 | France | 277/227 |
| 779763 | 7/1957 | United Kingdom | 277/188 A |
| 797684 | 7/1958 | United Kingdom | 277/188 A |
| 826214 | 12/1959 | United Kingdom | 277/233 |
| 929528 | 6/1963 | United Kingdom | 277/188 R |
| 962301 | 7/1964 | United Kingdom | 277/188 A |
| 1056960 | 2/1967 | United Kingdom | 277/188 A |
| 1142265 | 2/1969 | United Kingdom | 277/188 A |
| 1161529 | 8/1969 | United Kingdom | 277/188 A |

Primary Examiner—Robert S. Ward, Jr.
Attorney, Agent, or Firm—Browning, Bushman & Zamecki

[57] ABSTRACT

A sealing device comprising a main body section defining at least one sealing surface, and comprised of a flexible material a secondary anti-extrusion section adjoined to the exterior of the main body section and comprised of a material more rigid than that of the main body section, and a primary anti-extrusion section adjoined to the secondary anti-extrusion section adjacent an exterior surface thereof and comprised of a metallic material more rigid than that of the secondary anti-extrusion section.

20 Claims, 6 Drawing Figures

U.S. Patent    Jan. 12, 1982    4,310,163
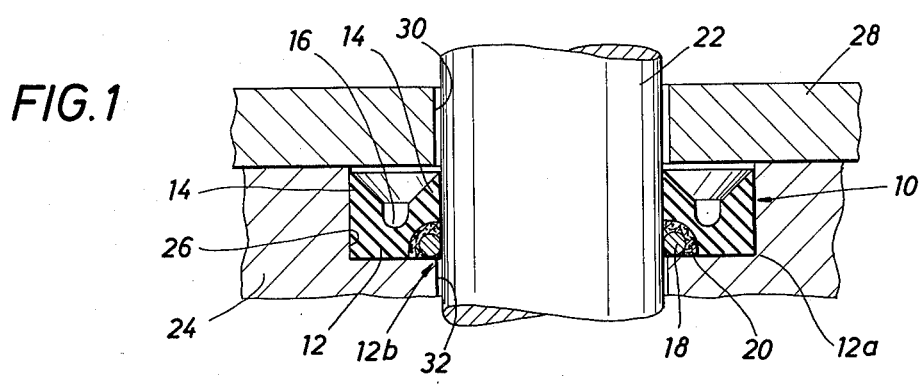
FIG.1
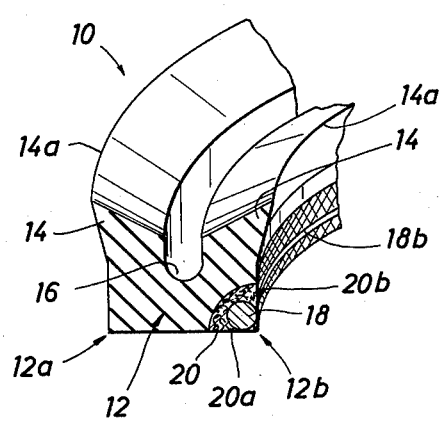
FIG.2
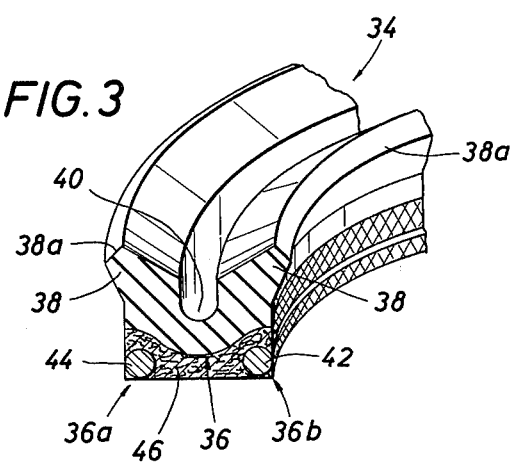
FIG.3
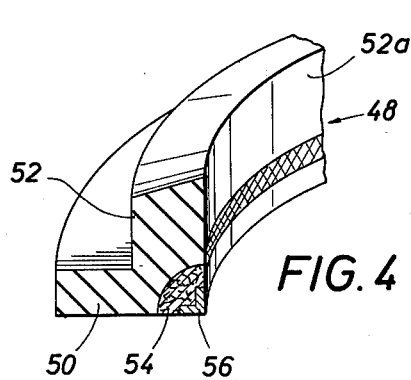
FIG.4
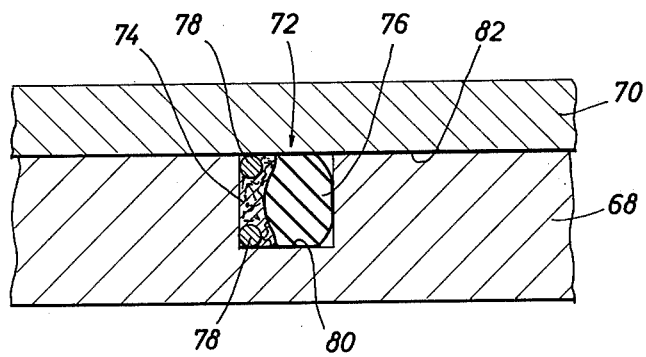
FIG.5
FIG.6 ly among the various sections of increasing rigidity. To put it another way, the secondary anti-extrusion section acts somewhat as a buffer between the relatively highly flexible or deformable (and thus easily extrudable) main body section and the rigid metallic primary anti-extrusion section. This puts less strain on the primary anti-extrusion section, which being formed of a relatively rigid metal, is itself resistant to extrusion even in the presence of extremely high pressures or other extrusion forces. Thus, there is less danger of failure of the primary anti-extrusion section in use. At the same time, the secondary anti-extrusion section, and the gradual breakdown of forces effected thereby, helps to prevent extrusion of the main body section over the anti-extrusion sections themselves. Additionally, should be primary anti-extrusion section fail, the secondary anti-extrusion section provides a backup measure for protection of the main body section.

ANTI-EXTRUSION SEALS AND PACKINGS

BACKGROUND OF THE INVENTION

1. Field of the Invention

The present invention relates to sealing devices and more particularly, to seals, packings and the like used in environments wherein at least a portion of the sealing device is subjected to extrusion forces.

Sealing devices such as seals or packings, whether of the dynamic or static type, are usually made, or have portions made, of materials which, to some extent, are resilient or at least flexible or deformable. In order to seal effectively, it is necessary that the sealing device be placed under some compressive loading between the components of the assembly to be sealed. Then, if the seal is subjected to a sufficient pressure in use, extrusion forces are set up which tend either to distort the seal and impair its effectiveness as such, or in more severe cases, for force portions of the seal into clearances between the components to be sealed.

2. Description of the Prior Art

One attempted solution to this problem has been to use separate rigid backup members such as washers in conjunction with the seals or packings. However, for various reasons, including simplification, effectiveness, minimizing of the space needed to accommodate these members, etc., it is usually more desirable to use an integral seal or packing.

Accordingly, other efforts have been directed at providing sealing devices having anti-extrusion elements integrally affixed to the more deformable or flexible portion thereof. In some cases, the anti-extrusion elements have been coil springs or other solid metal bodies. In such devices, the flexible portion of the seal sometimes extrudes over or past the anti-extrusion element due either to failure of the latter in service or to undetected manufacturing defects. It is believed that these problems may have been at least partially due to the relatively drastic difference in the rigidity of the two portions of such devices.

In other instances, the anti-extrusion sections of the sealing devices have been comprised of materials which, while not as readily deformable as the sealing portions of devices, are not as rigid as the metal bodies described above. Examples of such devices are shown in U.S. Pat. Nos. 3,094,337 and 3,719,366. However, when such devices are subjected to extremely high temperatures and/or pressures, the anti-extrusion elements themselves may become somewhat deformed by the extrusion forces.

SUMMARY OF THE INVENTION

The present invention comprises an anti-extrusion sealing device including a main body section defining at least one sealing surface and comprised of a flexible material. A secondary anti-extrusion section, which is comprised of material more rigid than that of the main body section, is adjoined to the exterior of the main body section. Finally, a primary anti-extrusion section is adjoined to the secondary anti-extrusion section adjacent an exterior surface of the latter. The primary anti-extrusion section is comprised of a metallic material even more rigid than that of the secondary anti-extrusion section.

With such construction, the pressure or extrusion forces applied to the sealing device in use are broken down gradually or incrementally within the device The anti-extrusion sections are preferably located on the main body section so as to form one or more corner portions of the sealing device as a whole, and are bonded to each other and/or to the main body section. The primary anti-extrusion section is preferably comprised of an integral solid metallic body, while the main body section is preferably formed of a resinous and/or elestomeric material. The secondary anti-extrusion section may also be comprised of a resinous and/or elastomeric material which is either more rigid than that of the main body section per se and/or rendered more rigid by reinforcing filaments.

The invention may take the form of numerous types of sealing devices, including annular seal rings, strip packings, etc., which may be designed for either static or dynamic sealing environments. For example, the invention may be incorporated into lip seals, cup seals, and/or squeeze packings.

Accordingly, it is a principal object of the present invention to provide an improved anti-extrusion sealing device including multiple anti-extrusion sections of increasing rigidity.

Another object of the present invention is to provide such a sealing device which can be produced in a large variety of different forms and adapted for numerous purposes and environments.

Still another object of the present invention is to provide an anti-extrusion seal having a safety or backup feature.

Still other objects, features, and advantages of the present invention will be made apparent by the following detailed description of exemplary preferred embodiments, the drawings, and the claims.

BRIEF DESCRIPTION OF THE DRAWINGS

FIG. 1 is a longitudinal cross-sectional view of a first embodiment of seal according to the present invention in a dynamic sealing environment.

FIG. 2 is an enlarged detail view of the seal of FIG. 1.

FIG. 3 is a view similar to that of FIG. 2 of a second embodiment of seal according to the present invention.

FIG. 4 is a view similar to that of FIG. 2 of a third embodiment of seal according to the present invention.

FIG. 5 is a view similar to that of FIG. 2 of a strip squeeze packing according to the present invention.

FIG. 6 is a cross-sectional view of a second embodiment of squeeze packing according to the present invention in a static sealing environment.

DESCRIPTION OF THE PREFERRED EMBODIMENTS

Referring to FIGS. 1 and 2, there is shown a first embodiment of the invention in the form of an annular seal ring, and more specifically, a U-ring packing 10. Ring 10 includes a base area 12 extending across and defining one axial end of the ring and a pair of lips 14 extending generally axially away from base area 12 to define the other axial end of ring 10. Lips 14 are annular, extending about the entire perimeter of ring 10, and defining therebetween a generally U-shaped annular groove 16. The outer portions of lips 14 diverge slightly away from each other in the relaxed state as shown in FIG. 2 and are feathered or tapered to form sharp outer edges 14a.

The base area 12 includes radially outer and radially inner corner portions 12a and 12b respectively. Radially inner corner portion 12b is defined by primary and secondary annular anti-extrusion sections 18 and 20 respectively. The remainder of ring 10, including all of base area 12 except sections 18 and 20 as well as both lips 14, comprises the main body section of ring 10. This main body section is comprised of a relatively highly deformable and flexible, and preferably elastomeric, material. Secondary anti-extrusion section 20 is bonded to the exterior of the main body section and, while preferably comprising an elastomeric material, is significantly more rigid than the main body section. Primary anti-extrusion section 18 is disposed adjacent exterior surfaces 20a and 20b of section 20, which converge to define the apex of corner portion 12b. Primary anti-extrusion section 18 is comprised of a metal even more rigid than the material of section 20.

As shown in FIG. 2, primary anti-extrusion section 18 is a solid metal body of circular cross-section which is essentially embedded in section 20. As previously mentioned, however, section 18 is disposed adjacent the converging outer surfaces 20a and 20b of secondary anti-extrusion section 20. Primary anti-extrusion section 18 may interrupt and be exposed along one or both of surfaces 20a and 20b, as shown for example at 18b. Alternatively, section 18 may be covered by a very thin layer of the material of section 20 along each of these surfaces. As another alternative, section 18 may simply be bonded into a corner recess in section 20 so that section 18 itself actually defines the radially intermost extremities of the corner surfaces. In any of these cases, section 18 would be considered to be disposed "adjacent" surfaces 20a and 20b as that term is used herein. In other words, the primary anti-extrusion element 18 should be disposed close enough to surfaces 20a and 20b so that, in use, it will in turn be disposed close enough to the members being sealed to prevent extrusion across section 18 of the material of either section 20 or the main body section, and in such cases, will be considered to be disposed "adjacent" surfaces 20a and 20b.

Referring to FIG. 1, U-ring packing 10 is shown forming a seal between a movable shaft 22 and housing 24 through which shaft 22 extends. Housing 24 is counterbored as indicated at 26 to define with shaft 22 an annular recess for receipt of ring 10. The recess is closed, and thus ring 10 held in place therein, by a packing gland 28 which is secured to housing 24 as by threaded bolts (not shown) or other means well known in the art. Packing gland 28 has an aperture 30 through which shaft 22 extends. As mentioned, shaft 22 is movable, and in various applications, may be either reciprocating or rotating.

In use, fluid under pressure leaks between shaft 22 and packing gland 28 at aperture 30 and will enter groove 16 of ring 10. This pressurized fluid will tend to force lips 14 away from each other thereby urging the innermost lip 14 more tightly against shaft 22 and the outermost lip more tightly against housing 24. Since the fluid pressure being sealed against serves to activate or tighten the seal, ring 10 is referred to as a "dynamic" type seal.

This same fluid pressure will also tend to extrude the material of ring 10 into the clearance 32 between shaft 22 and housing 24. However, the presence of anti-extrusion sections 20 and 18 defining the corner portion of ring 10 adjacent clearance 32 prevents such extrusion and thus ensures that the more deformable and flexible main body section, and more specifically the lips 14, will be kept in place in sealing engagement with shaft 22 and housing 24.

More specifically, the metal primary anti-extrusion section 18 is sufficiently rigid to prevent extrusion even in the presence of relatively high extrusion forces causes by fluid pressure. However, the provision of the secondary anti-extrusion section 20 of intermediate rigidity allows these forces to be incrementally broken down within the seal ring 10 as a whole thereby decreasing the strain placed on primary anti-extrusion section 18. This not only enhances the overall anti-extrusion effect, but also helps to ensure against damage to primary anti-extrusion section 18. Nevertheless, should section 18 somehow become damaged, or include undetected manufacturing defects, extrusion will still ordinarily be prevented by section 20 which thus further acts as a safety or backup anti-extrusion element.

As previously mentioned, the rigidity of section 20 is intermediate that of metallic primary anti-extrusion section 18 and the main body section of ring 10. In general, it is preferred that the main body section and the secondary anti-extrusion section 20 both comprise a resinous, and preferably and an elastomeric, material. Even though both the sections are elastomeric, section 20 can be made significantly more rigid than the main body section in a number of ways. One of these is simply to form section 20 of a more rigid elastomer than the main body section. Another is to form section 20 of an elastomer similar to that of the main body section but further include in section 20 reinforcing filaments to increase rigidity. In some instances, the main body section may also be reinforced, in which case section 20 would have a more dense filament network, a different type of reinforcing filament, and/or a different type of elastomer so as to make it significantly more rigid than the main body section. Section 20 is also bonded to the main body section as well as to section 18 either by the elastomer which is comprises, if that elastomer is capable of forming a bond, or alternatively, by a thin layer of a suitable adhesive or other bonding material.

The resinous and/or elastomeric materials used in forming the main body section and the secondary anti-extusion section can include thermoplastic materials, thermosetting materials, or mixed thermoplastic/thermosetting materials, either with or without fabric or other filamentous reinforcing members. As used herein, the term "thermosetting" applies to those resins, generally synthetic in nature, which solidify or set on heating and can not be remelted. Non-limiting examples of such thermosetting resins include phenolics, alkyds, amino resins, polyesters, epoxies, silicones, flurocarbon resins, and the like. The term "thermoplastic," as used herein, applies to resins, generally synthetic in nature, that may soften by heat and then regain their original properties upon cooling. Non-limiting examples of such thermoplastic materials include nylon, polyethylene, polypropylene, cellulose and acrylic resins, polycarbonates, polyhaloolefins and the like. In addition, non-synthetic materials, such as natural rubbers, can be used.

As previously mentioned, at least the secondary anti-extrusion section 20 is reinforced with filamentous material. The reinforcing filaments may be in the form of a fabric, either woven or knitted, or a chopped or flocked filler. The filaments or fibers used for such reinforcing fabrics or fillers may include metals, synthetic materials, and natural non-metallic materials, as well as mixtures of these various general types of materials. Non-limiting examples of suitable metals for use in such filaments include: stainless steel, aluminum, copper, brass, monel, etc. Examples of synthetic and natural non-metallic materials suitable for use in the reinforcing filaments are: aramid, graphite, cotton, asbestos, fiberglass, nylon, polyesters, linen, rayon, as well as blends of such materials such as cotton-polyester fabrics or rayon-polyester fabrics.

The metallic primary anti-extrusion section 18 could be comprised of copper, brass, stainless steel, aluminum, monel, or any other suitable metal.

Turning now to FIG. 3, there is shown a second embodiment of sealing device, also in the form of a U-ring packing 34. Like ring 10, ring 34 includes a base area 36 at one axial end and a pair of sealing lips 38 extending therefrom and forming the other axial end of the packing ring. An annular groove 40 is defined between lips 38. As shown, lips 38 diverge radially from each other in their relaxed state. Furthermore, the outer surfaces of each lip 38 are tapered toward each other, but rather than converging in a sharp edge such as 14a in the first embodiment, are joined by a blunt outer edge surface 38a. Ring 34 also differs from ring 10 in that it includes anti-extrusion sections in both corner portions 36a and 36b of base area 36. More specifically, a first primary anti-extrusion section in the form of annular metal ring 42 partially defines the radially inner corner portion 36b of base 36, while a second such metal ring 44 partially defines the radially outer corner portion 36a. A secondary anti-extrusion section 46 defines the remainder of corner portions 36a and 36b and also extends between these corner portions across the entire axial outermost part of base area 36. Thus, the ring 34 might be used in applications in which there is a possibility of extrusion at either of the corner portions 36a or 36b, in applications where the fluid pressures are extremely high, and or in various situations in which reinforcement is desired across the entire width of the base area of the U ring.

As in the first embodiment, the main body section of ring 34, including lips 38 and the portion of base area 36 not defined by the anti-extrusion sections, is comprised of a relatively flexible preferably elastomeric, material. Secondary anti-extrusion section 46, is significantly more rigid than the main body section and is bonded to the exterior of the main body section. Primary anti-extrusion sections 42 and 44 are metallic and even more rigid than section 46 and are bonded to section 46 adjacent the exterior surfaces thereof which converge at the apex of corner portions 36a and 36b. The materials of which the various sections of ring 34 are comprised may be similar to those of the analogous parts of ring 10 of FIGS. 1 and 2.

Other variations of double lipped seal rings may also be made in accord with the present invention. For example, in both of the embodiments represented in FIGS. 1-3 the base area of the ring is disposed at one axial end thereof with the two lips extending generally axially away from the base area to seal against respective radially inner and outer machine parts. However, in other embodiments, the base area may extend across the entirety of either the radially inner or radially outer area of the seal ring with the two lips extending generally radially (either inwardly or outwardly depending upon the location of the base) from the base. In any event, it is possible to provide a U-ring packing with both primary and secondary anti-extrusion sections at both corners of the base area but without continuity of the secondary anti-extrusion section(s) across the entire width of the base area.

Referring to FIG. 4, there is shown another form of annular packing device or seal ring, namely a cup seal 48. Seal 48 includes a base area 50 of generally rectangular cross-section and a sealing lip 52 extending longitudinally away from base area 50 at its radially inner extremity. Cup seal 48 is a dynamic type seal so that the fluid pressure being sealed against in use urges the sealing surface 52a of annular lip 52 tightly against the member being sealed. This same fluid pressure may tend to cause extrusion adjacent the radially inner corner portion of the base area 50. Accordingly, this corner portion is defined by an annular secondary anti-extrusion section 54 bonded to the exterior of the main body section and comprised of a more rigid material than the main body section, and a metallic primary anti-extrusion section 56 comprised of a material which is even more rigid than that of section 54. The materials of the various sections of seal ring 48 may be similar to those of the embodiments described hereinabove. Primary anti-extrusion section 56 differs from the primary anti-extrusion sections of the preceeding embodiments in that it is L shaped, rather than round, in cross-sectional configuration and is bonded to the exterior of, rather than essentially embedded in, section 54 so that it defines the convergent extremities of the corner surfaces at and near the apex.

FIG. 5 shows the present invention as applied to a squeeze packing in strip form. Such a strip packing is cut to the appropriate length and then fitted into the apparatus to be sealed. More specifically, the cut strip may be formed into an annulus or other closed configuraton and its ends secured together by an appropriate bonding material when installed. As mentioned, packing 58 is not of a dynamic type but rather is a static or squeeze type packing wherein the seal is effected virtually exclusively by compressive forces exerted on the packing, and is not significantly enhanced by the pressure sealed against.

Packing 58 is square in cross-sectional configuration. It includes a main body section 60 comprised of a relatively flexible material similar to those of the main body sections of the embodiments described above. A pair of anti-extrusion sections 62 are bonded to opposite sides of main body section 60. Secondary anti-extrusion sections 62 are comprised of a material, similar to that of the secondary anti-extrusion elements of the preceeding embodiments, which is significantly more rigid than the material of main body section 60. Four primary anti-extrusion sections 64, comprised of an even more rigid metal, are bonded to and essentially embedded in secondary anti-extrusion sections 62 adjacent respective corner portions of the packing. Sections 64 are disposed closely adjacent the exterior surfaces of sections 62 so that they may prevent extrusion of the material of sections 62 and/or 60 at all four corners. Along two opposite sides of packing 58, main body section 60 is exposed intermediate the corner portions defined by the anti-extrusion elements to form a pair of sealing surfaces 66 for engagement with the apparatus to be sealed.

FIG. 6 also shows a static or squeeze type packing 72 in use sealing between the body 68 and door 70 of a high pressure vessel or the like. The seal or packing 72 differs from packing 58 in that it has only a single secondary anti-extrusion section 74 extending along one side of the main body section 76 and has metallic primary anti-extrusion sections 78 located only at the two corner portions of the device defined by section 74. FIG. 6 also shows the deformation of main body section 76 in use by the compressive forces exerted thereon by members 68 and 70 so that device 72 engages all three sides of the groove 80 in housing 68 in which said device is disposed as well as the opposed surface 82 of door 70.

Numerous modifications of the exemplary embodiments described above can be made within the scope of the invention. More particularly, primary and secondary anti-extrusion sections could be incorporated into various other types of sealing devices, both dynamic and static, having virtually any type of transverse cross-sectional configuration so long as the anti-extrusion sections are suitably configured and located at areas of potential extrusion. In addition to seals of other cross-sectional configurations, the invention could be incorporated in sealing devices other than strip packings or annular seal rings, e.g. eliptical rings or other non-annular closed or ring-like sealing devices.

Likewise, the configurations of the anti-extrusion sections themselves could be changed. For example, in the embodiments shown, it is contemplated that, if the sealing device on the whole is annular, each anti-extrusion section is also annular and extends about the entire circumference of the device. Likewise, in the embodiments shown, if the sealing device in question is a strip packing, it is contemplated that the anti-extrusion sections extend along the entire length thereof. However, in some applications it may be sufficient to provide the anti-extrusion sections only at selected positions along the length or circumference of the device. Similarly, the configurations of the anti-extrusion sections in transverse cross section could be varied. More specifically, the two types of primary anti-extrusion sections shown are those of round cross section and L-shaped cross section. Square, rectangular, or triangular sectioned primary anti-extrusion sections could also be used. Likewise, other solid metallic bodies, such as coil springs, could be used as the primary anti-extrusion elements.

Still other modifications will suggest themselves to those of skill in the art. Accordingly, it is intended that the scope of the invention be limited only by the claims which follow.

I claim:

1. An anti-extrusion sealing device including a base area having a corner portion, and a sealing area distal said corner portion and having at least one sealing surface disposed on the same side of said device as said corner portion, said sealing device being comprised of:

a main body section defining said sealing area and comprised of a flexible material, a secondary anti-extrusion section adjoined to the exterior of said main body section and defining two exterior surfaces converging in said corner portion, said secondary anti-extrusion section being comprised of a material more rigid than that of said main body section;

and a primary anti-extrusion section embedded in said secondary anti-extrusion section at said corner portion adjacent said two exterior surfaces thereof but substantially covered by said secondary anti-extrusion section, said primary anti-extrusion section being comprised of a metallic material more rigid that that of said secondary anti-extrusion section.

2. The device of claim 1 wherein said main body section is comprised of a resilient elastomeric material.

3. The device of claim 2 wherein said secondary anti-extrusion section is comprised of an elastomeric material with reinforcing filaments therein.

4. The device of claim 3 wherein said filaments are in the form of a fabric.

5. The device of claim 3 wherein at least some of said filaments are comprised of metal.

6. The device of claim 3 wherein at least some of said filaments are comprised of a synthetic material.

7. The device of claim 3 wherein at least some of said filaments are comprised of a natural non-metallic solid.

8. The device of claim 2 wherein said primary anti-extrusion section is comprised of a solid, continuous metallic body of circular transverse cross-section.

9. The device of claim 2 wherein said secondary anti-extrusion section is comprised of a resinous material with reinforcing filaments therein.

10. The device of claim 1 wherein said base area includes two such corners portions.

11. The device of claim 10 wherein each of said corner portions includes a respective primary anti-extrusion section, and said secondary anti-extrusion section extends across said base area from one of said corner portions to the other.

12. The device of claim 10 wherein said main body section includes a pair of sealing lips extending generally away from said base area.

13. The device of claim 10 being a squeeze packing of four-sided transverse cross-sectional configuration.

14. The device of claim 13 including at least two such secondary anti-extrusion sections and four such primary anti-extrusion sections defining four such corner portions.

15. The device of claim 1 wherein said main body section includes at least one sealing lip extending generally away from said corner portion.

16. The device of claim 1 being an annular packing ring.

17. The device of claim 16 wherein each of said sections is annular.

18. The device of claim 1 being an elongate strip packing.

19. The device of claim 18 wherein each of said sections extends substantially along the entire length of said strip packing.

20. The device of claim 1 wherein said secondary anti-extrusion section is bonded to said main body section.

* * * * *